(12) United States Patent
Campbell et al.

(10) Patent No.: US 8,098,445 B2
(45) Date of Patent: Jan. 17, 2012

(54) FOCUSSING APPARATUS

(75) Inventors: Colin Campbell, Edinburgh (GB); Eric Saugier, Lancey (FR)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 0 days.

(21) Appl. No.: 12/013,078

(22) Filed: Jan. 11, 2008

(65) Prior Publication Data

US 2008/0170307 A1    Jul. 17, 2008

(30) Foreign Application Priority Data

Jan. 11, 2007   (EP) .................................... 07000560

(51) Int. Cl.
*G02B 7/02*   (2006.01)
(52) U.S. Cl. ...................................................... 359/824
(58) Field of Classification Search ........... 359/819–824
See application file for complete search history.

(56) References Cited

U.S. PATENT DOCUMENTS

| | | | | |
|---|---|---|---|---|
| 3,695,534 A * | 10/1972 | Treise | ........................ | 242/364.3 |
| 4,472,024 A * | 9/1984 | Konomura et al. | ........... | 359/814 |
| 4,601,539 A * | 7/1986 | Watanabe | ...................... | 359/824 |
| 5,519,198 A * | 5/1996 | Plesko | ......................... | 235/462.4 |
| 6,097,552 A * | 8/2000 | Gordon et al. | ................ | 359/814 |
| 7,227,285 B2 * | 6/2007 | Osaka | .............................. | 310/15 |
| 7,291,942 B2 * | 11/2007 | Osaka | .............................. | 310/12 |
| 7,330,310 B2 * | 2/2008 | Hengst et al. | .................. | 359/418 |
| 7,492,538 B2 * | 2/2009 | Ishizawa et al. | ............... | 359/824 |
| 2004/0017620 A1 * | 1/2004 | Kaneko et al. | ................. | 359/824 |
| 2004/0109236 A1 | 6/2004 | Nishioka | ........................ | 359/643 |
| 2006/0034599 A1 | 2/2006 | Osaka | ............................. | 396/144 |
| 2006/0109565 A1 * | 5/2006 | Watanabe et al. | ............. | 359/694 |
| 2007/0133972 A1 * | 6/2007 | Lee et al. | ....................... | 396/133 |
| 2008/0231974 A1 * | 9/2008 | Jung | .............................. | 359/824 |

FOREIGN PATENT DOCUMENTS

EP    1674911    6/2006

* cited by examiner

*Primary Examiner* — Ricky Mack
*Assistant Examiner* — Vipin Patel
(74) *Attorney, Agent, or Firm* — Lisa K. Jorgenson; Allen, Dyer, Doppelt, Milbrath & Gilchrist, P.A.

(57) ABSTRACT

A focusing device for a lens, including a frame, a lens carrier movable relative to the frame from a first position along an optical axis, a motor for driving the lens carrier along the optical axis, and at least one biasing member adapted to bias the lens carrier towards the first position. The biasing member may include one or more bending members.

20 Claims, 7 Drawing Sheets

FOCUSSING APPARATUS

FIELD OF THE INVENTION

The present invention relates to a drive arrangement for positioning a lens to adjust the focus thereof, and a device incorporating such a drive arrangement. In particular, but not exclusively, the invention relates to an autofocus system for imaging devices, such as camera units incorporated in mobile telephones and other mobile devices.

BACKGROUND OF THE INVENTION

Most mobile telephones now incorporate a camera unit. The camera unit typically includes a solid state imaging sensor and a lens. The camera unit must be physically small and light-weight. In addition, battery capacity is a significant problem in these and similar mobile devices.

In conventional camera units, the focus of the lens is set by mounting the lens in a support structure commonly referred to as a barrel. For autofocus systems, the barrel, and thus the lens, is moved relative to the solid state imaging sensor. This is achieved by coupling the barrel to a carriage which is driven by some form of motor.

Known forms of autofocus assemblies are relatively large and heavy, and consume relatively large amounts of power. It is also difficult to provide an accurate end stop to the lens travel corresponding to the optimum infinity setting.

Conventional drive assemblies often include coil spring arrangements with the motor to drive the lens assembly and retain it at a desired position. However, coil springs require a significant amount of space in the direction of the spring axis, since the spring must be of sufficient length to provide the travel required. Tension springs require even greater space in the direction of the spring axis to accommodate spring extension. They also provide a relatively low resistance to rotation in either direction about the spring axis. Also, many coil springs are unidirectional, unless substantially modified.

Furthermore, conventional drive assemblies typically consume relatively large amounts of power. One reason for this is that coil spring arrangements are typically relatively stiff and so they require relatively large tensile or compressive forces to displace the springs from their neutral state. Another reason is that conventional motors themselves consume relatively large amounts of power.

It is desirable to improve each of the size, weight, positioning accuracy and simplicity (particularly in terms of the number of parts) of conventional drive assemblies in camera units.

EP 05270103.4 describes a focusing system for the lens of a camera unit. The system includes a master post fixed to a frame and the barrel is slidably mounted on the post via bearings. A piezoelectric motor drives the barrel bidirectionally along the axis of the post.

Piezoelectric motors are known to be smaller, lighter, more accurate and involve fewer parts than other forms of drive motors. A known piezoelectric motor is described in U.S. Pat. No. 6,768,245 to Mock et al. and is available from Miniswys SA of Biel (CH). A disadvantage is that they typically lack available power for driving components. However, the system of EP 05270103.4 significantly reduces the friction present and so reduces the power consumed when driving the barrel. This allows the use of a piezoelectric motor. However, friction cannot be totally eliminated with this system since it will be present between the barrel and the bearings. Also, the axis of the post is necessarily offset from the barrel axis. This creates a moment about the post axis which increases the friction present.

SUMMARY OF THE INVENTION

According to a first aspect of the present invention there is provided a focusing apparatus for a lens, which may include a frame, a lens carrier movable relative to the frame from a first position along an optical axis, and a motor for driving the lens carrier along the optical axis. At least one bending member may be adapted to bias the lens carrier towards the first position.

It is to be understood that the term "bending member" may relate to a component which is adapted to deflect primarily in a bending mode when a force is applied to the component in the direction of the optical axis. Specifically, the term does not apply to coil springs and the like in which the spring axes are arranged collinear or parallel to the optical axis such that the coil springs deflect primarily in a tensile or compressive mode when a force is applied in the direction of the optical axis, for example. Conceivably, the term could apply to a coil spring in which the spring axis is arranged substantially normal to the optical axis such that the coil spring deflects primarily in a bending mode when a force is applied in the direction of the optical axis.

Preferably the at least one bending member may include a flat spring. Synonymous terms for "flat spring" include a plate spring or leaf spring, for example.

Preferably at least one bending member may be substantially planar. Alternatively, the at least one bending member may be arcuate, such as convex or concave, for example. Preferably the planar member may be stamped from a sheet material, such as sheet metal, for example.

The at least one bending member may include a first bending member defining a central first aperture. The center of the first aperture may be aligned with the optical axis. Preferably a portion of the lens carrier may be provided within the first aperture. Preferably the first bending member may be provided at or near a first end of the lens carrier.

Preferably the at least one bending member may include at least one linking member having a first end coupled to the lens carrier. Preferably the linking member may have a second end positioned adjacent the first aperture. Preferably the linking member may spiral between the first aperture and the lens carrier.

Preferably the first bending member may include three linking members. The three linking members may be substantially equispaced about the first aperture, for example.

Preferably the at least one bending member may include a second bending member. The second bending member may comprise a flat spring. Preferably the second bending member may be substantially planar. Preferably the second bending member may include a substantially central second aperture. Preferably the center of the second aperture may be aligned with the optical axis. Preferably a portion of the lens carrier may be provided within the second aperture. Preferably the second bending member may be provided at or near a second end of the lens carrier.

Preferably the second bending member may include at least one linking member having a first end coupled to the lens carrier. Preferably the linking member may have a second end positioned adjacent the second aperture.

Preferably the linking member may spiral between the second aperture and the lens carrier.

The second bending member may include three linking members. The three linking members may be equispaced about the second aperture.

The motor may comprise a linear motor. The motor may also comprise a piezoelectric motor, for example.

Preferably the motor may be adapted to drive the lens carrier bidirectionally along the optical axis.

The apparatus may also include a position sensor arranged to detect the position of the lens carrier relative to the frame.

Preferably the apparatus may include a stop member for limiting the movement of the lens carrier relative to the frame.

According to a second aspect of the present invention there is provided a lens assembly comprising an apparatus in accordance with the first aspect of the invention.

According to a third aspect of the present invention there is provided a camera comprising an apparatus in accordance with the first aspect of the invention.

According to a fourth aspect of the present invention there is provided a mobile electronic device, such as a mobile telephone or a PDA, comprising an apparatus in accordance with the first aspect of the invention.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
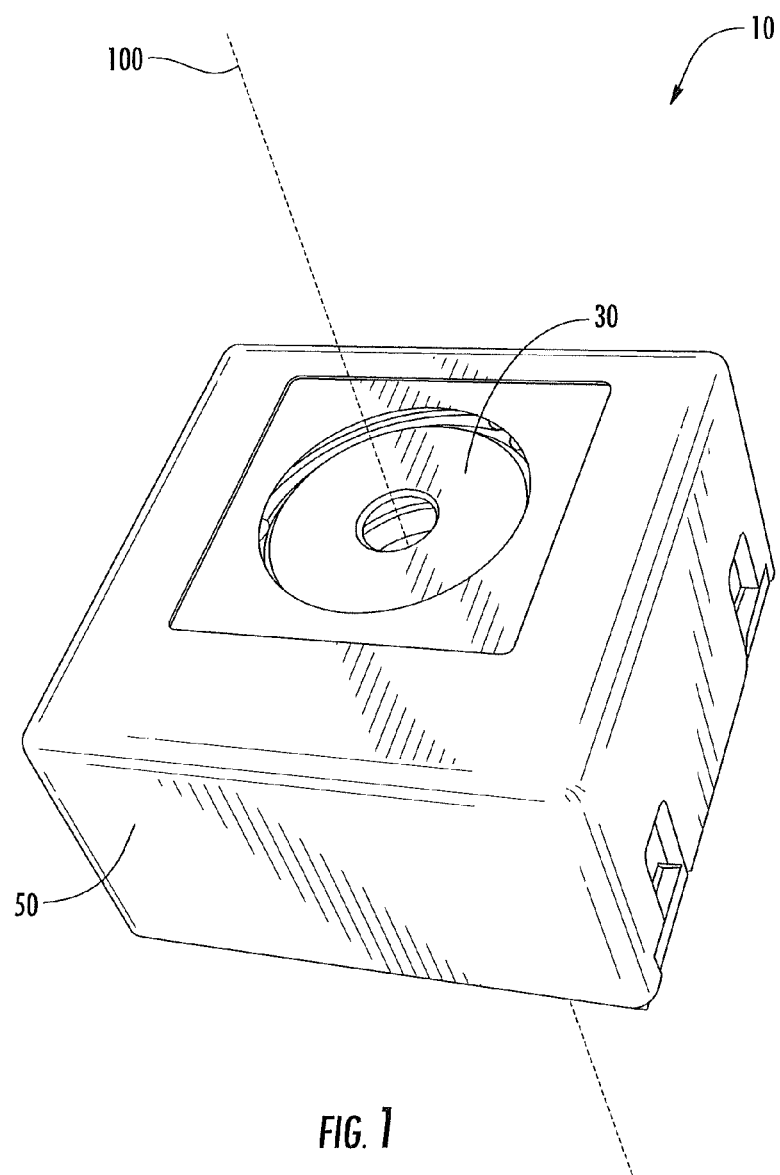
FIG. 1 is a perspective view of focusing apparatus for a lens in accordance with the present invention.
Figure 2:
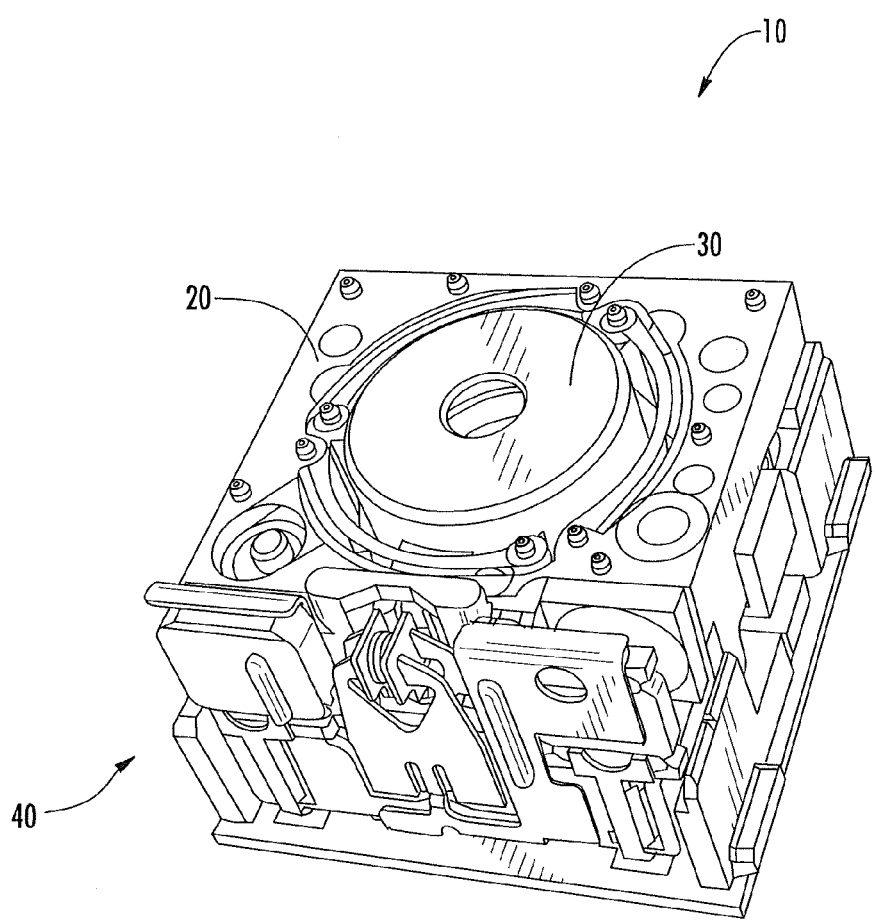
FIG. 2 is a perspective view of the apparatus of FIG. 1 without an outer EMI shield.
Figure 3:
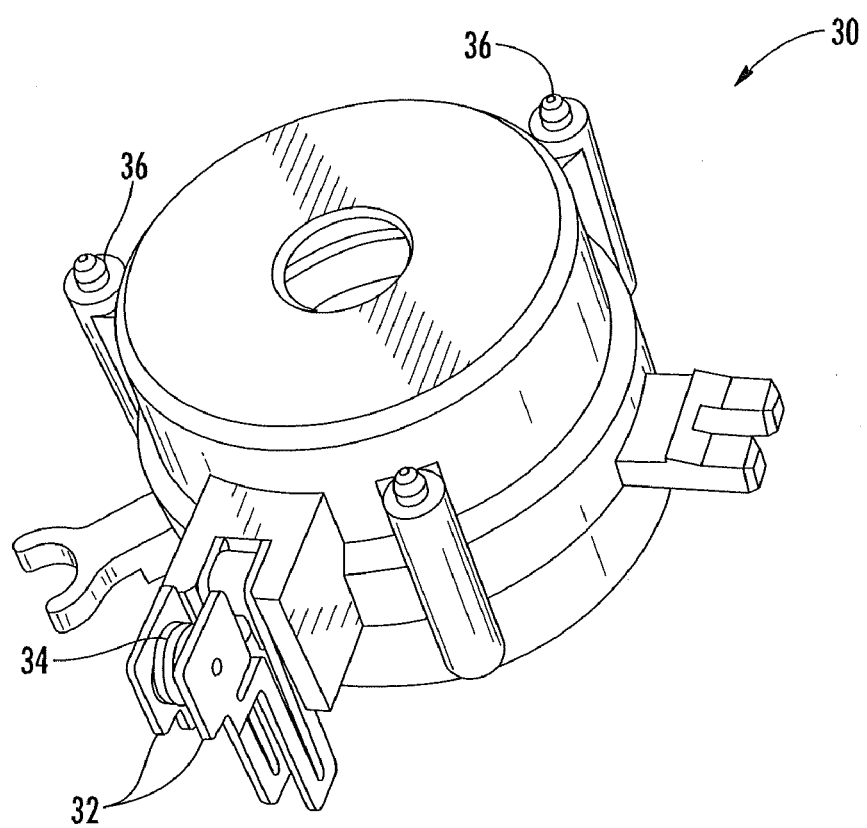
FIG. 3 is a perspective view of a barrel of the apparatus of FIG. 1.
Figure 4:
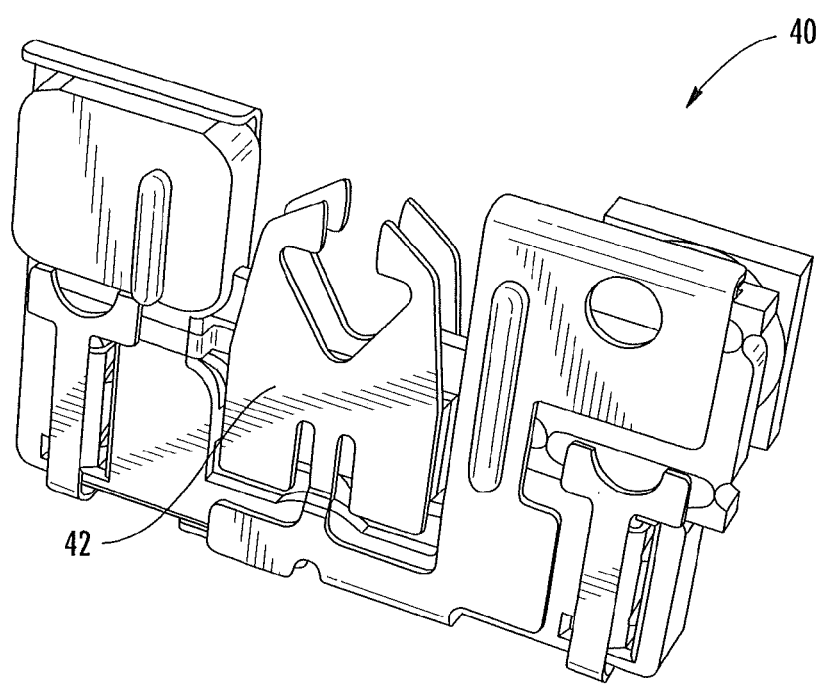
FIG. 4 is a perspective view of a motor of the apparatus of FIG. 1.
Figure 5:
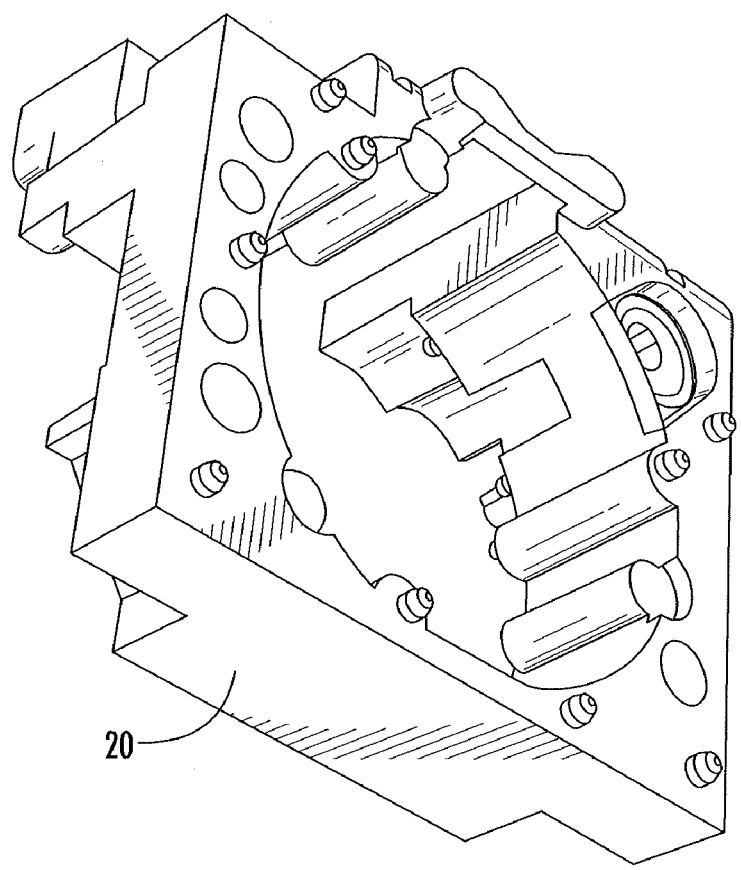
FIG. 5 is a perspective view of a frame of the apparatus of FIG. 1.

Referring to the figures there is shown a focusing apparatus 10 for a lens (not shown). The apparatus 10 comprises a frame 20, and a lens carrier or barrel 30 which is movable relative to the frame 20 from a first position along an optical axis 100. The apparatus 10 also includes a piezoelectric motor 40 for driving the barrel 30 along the optical axis 100.

The lens may be a single lens element or a compound lens formed by two or more elements. The details of the lens design form no part of the present invention and need not be described here.

FIG. 1 shows an outer shield 50 which is an electromagnetic interference (EMI) shield and also serves as a protective cover to the internal operating parts. It has no other functional significance, and will not be described further.

The barrel 30 which supports the lens may be moved in either direction along the optical axis 100 relative to the frame 20 to provide focusing of an image onto an imaging sensor (not shown) such as a CMOS sensor. This movement of the barrel 30 is effected by the piezoelectric motor 40.

Piezoelectric motors are known and the motor 40 will not be described in detail. Full details of a suitable motor can be found in U.S. Pat. No. 6,768,245. Briefly stated, a high frequency electrical field operating on a pair of piezoelectric sheets produces linear movement, selectively forward or back, of a chuck 42. The piezoelectric motor 40 can produce rapid and very accurate movement. The chuck 42 engages with left and right chuck guides 32 provided at the barrel 30 which are biased apart by a spring 34.

Figure 6:
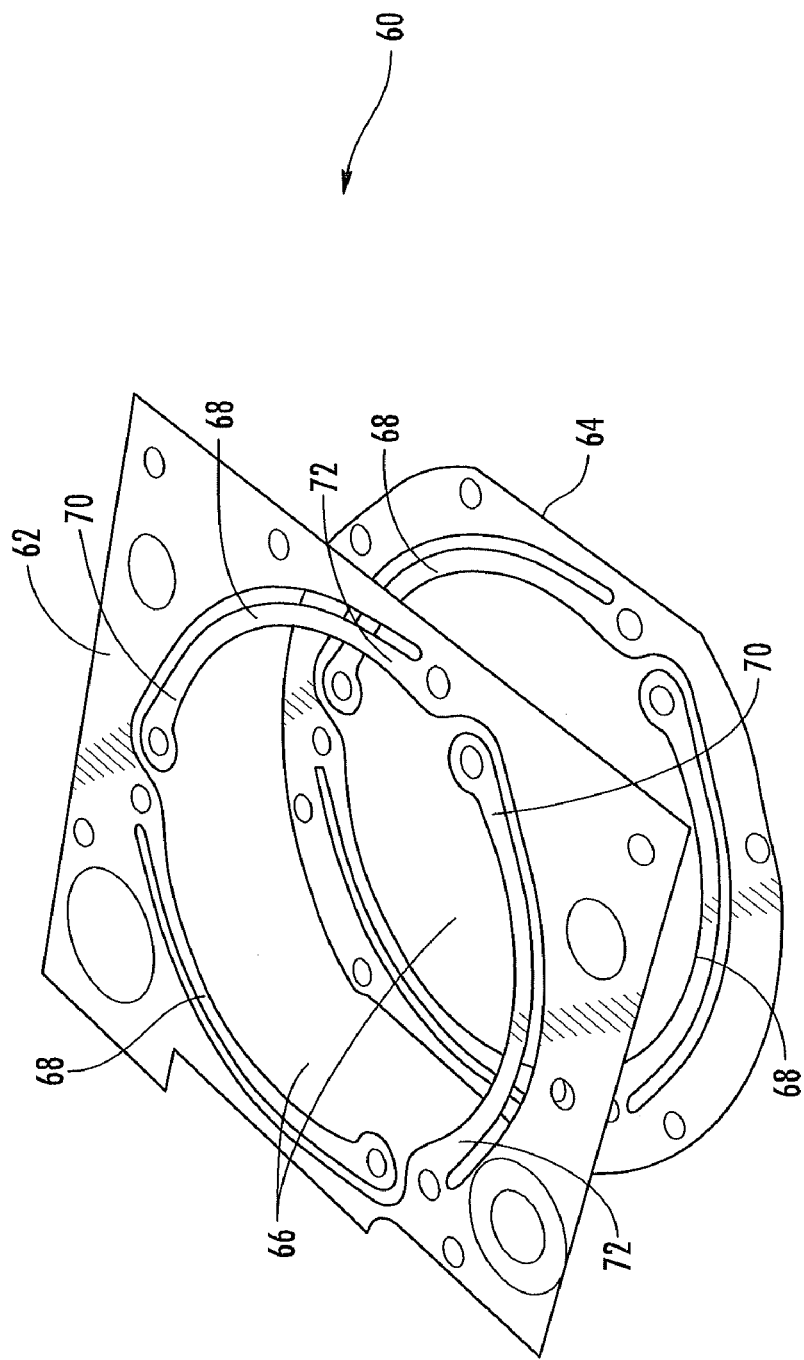
FIG. 6 is a perspective view of first and second bending members of the apparatus of FIG. 1.
Figure 7:
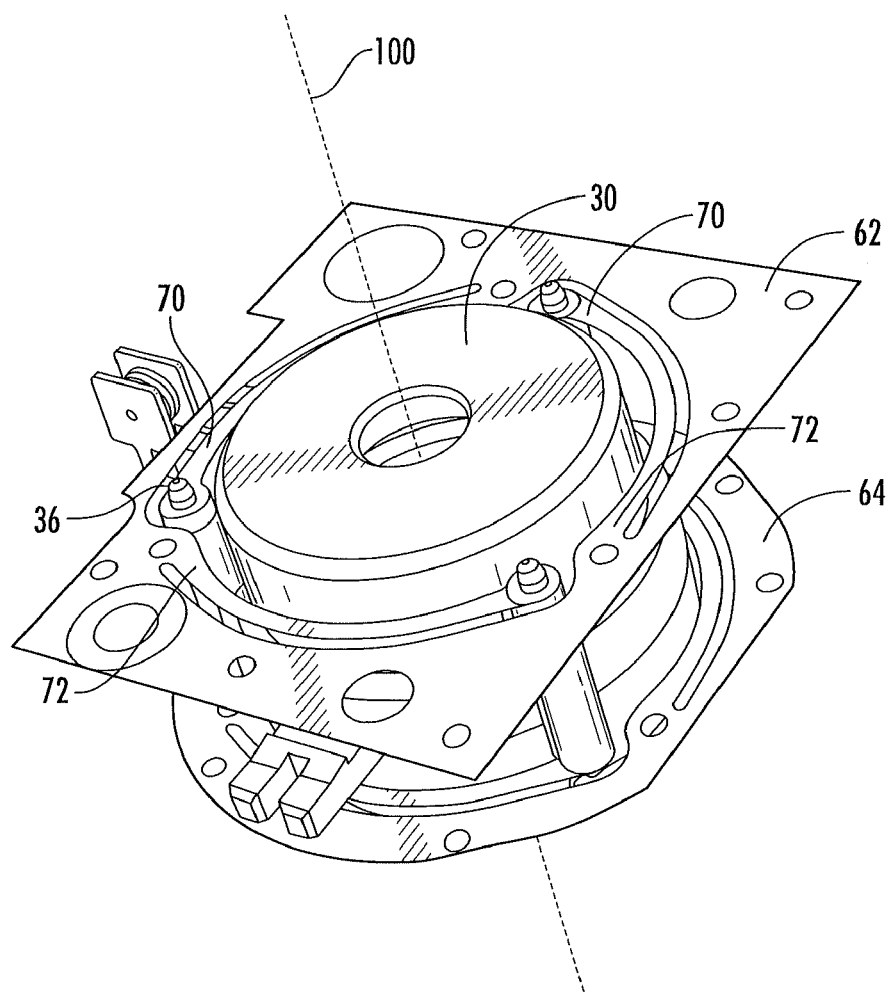
FIG. 7 is a perspective view of the barrel of FIG. 3 and the first and second bending members of FIG. 6.

As shown in FIGS. 6 and 7, the apparatus 10 also includes biasing means 60 for biasing the barrel 30 towards the first position. This biasing means 60 comprises a first bending member 62 and a second bending member 64.

Each of the first and second bending members comprises a flat spring formed from a sheet metal material. Each bending member is fixed relative to the frame 20 about its periphery and includes a substantially central first aperture 66, the center of which is aligned with the optical axis 100. The barrel 30 is provided within each of these apertures 66, as shown in FIG. 7.

Each bending member includes three linking members or spiral arms 68. Each spiral arm 68 has a first end 70 fixed to a post 36 provided at the barrel 30 and a second end 72 provided at the respective aperture 66. The three spiral arms 68 are equispaced about the aperture 66. The first end 70 of each spiral arm 68 is circumferentially offset from the second end 72 such that the spiral arm 68 spirals inwardly between the aperture 66 and the barrel 30.

The major plane of each bending member, and of each spiral arm 68 in particular, is normal to the optical axis 100. Therefore, each spiral arm 68 will deflect from a first position out of this major plane in a bending mode when a force is applied to each bending member in the direction of the optical axis 100. Such a force is applied when the barrel 30 is moved relative to the frame 20 in the direction of the optical axis 100. Each spiral arm 68 can bend in either direction out of the major plane without any additional modification. Each spiral arm 68 also provides a high resistance to rotation of the barrel 30 relative to the frame 20 in either direction about the optical axis 100.

In a preferred embodiment, each bending member is in an unstressed state at the first position when no axial load is applied. In other embodiments, at the first position the first bending member 62 may be pre-stressed such that there is bending in one direction while the second bending member 64 is also pre-stressed such that there is bending in the opposite direction. Each bending member will then be arcuate to a certain degree. The barrel 30 will adopt an equilibrium position between the two bending members. In all the illustrated embodiments, the barrel 30 can be considered to be the illustrated floating between the two bending members. Also, the biasing force from each bending member is substantially aligned with the optical axis 100. The arrangement therefore provides a centering mechanism for maintaining the barrel 30 aligned to the optical axis 100.

A position sensor (not shown) detects the position of the barrel 30 relative to the frame 20. A stop member (not shown) limits the movement of the barrel 30 relative to the frame 20.

The geometry of each bending member provides a significant space saving in the direction of the optical axis, since only the thickness (rather than the axial length of a coil spring) and the out of plane bending of the two flat sheets of the bending members need be accommodated. The out of plane bending represents a deflection in the direction of the spring axis which is substantially greater than that for a coil spring subject to the same axial load. However, this means that the barrel 30 can be moved a greater distance in the direction of the optical axis 100 for a given axial load. The range of travel of the barrel 30 can therefore be increased.

Similarly, a lower axial load is required to retain the barrel 30 at a given distance from the first position.

In addition, no component is sliding relative to another component, and so there is substantially no friction present.

Thus, the spring arrangement of the invention is particularly suitable for use with piezoelectric motors which have less available power. The apparatus of the invention reduces the force, and therefore the power, required to drive the lens assembly to its desired position. Indeed, the assembly can travel from one end to the other of its travel range in 30 ms. The combination of the spring arrangement of the invention and a piezoelectric motor provides a drive assembly which is smaller, lighter and more accurate. The drive assembly is also simpler. For instance, the drive assembly of the invention eliminates the need for a carriage.

Various modifications and improvements can be made without departing from the scope of the present invention.

That which is claimed:

1. A focusing apparatus for a lens comprising:
   a frame;
   a lens carrier movable bi-directionally relative to said frame from a first position along an optical axis;
   a motor for driving said lens carrier bi-directionally along the optical axis;
   a first bending member adapted to bias said lens carrier towards the first position and further adapted to be in a pre-stressed state in the first position; and
   a second bending member adapted to bias said lens carrier away from the first position and further adapted to be in a pre-stressed state in the first position;
   said lens carrier being in an equilibrium position between the first and second bending members in the first position.

2. The focusing apparatus according to claim 1, wherein at least one of the first and second bending members comprises at least one flat spring.

3. The focusing apparatus according to claim 1, wherein the first bending member has a first aperture therein aligned with the optical axis.

4. The focusing apparatus according to claim 3, wherein at least a portion of said lens carrier is receivable within the first aperture.

5. The focusing apparatus according to claim 3, wherein the first bending member comprises at least one linking member having a first end coupled to said lens carrier.

6. The focusing apparatus according to claim 5, wherein the at least one linking member further comprises a second end positioned adjacent the first aperture.

7. The focusing apparatus according to claim 6, wherein the first bending member comprises three linking members equispaced about the first aperture.

8. The focusing apparatus according to claim 1, wherein the second bending member has a second aperture therein aligned with the optical axis.

9. The focusing apparatus according to claim 8, wherein the second bending member comprises at least one linking member having a first end coupled to the lens carrier, and a second end positioned adjacent the second aperture.

10. The focusing apparatus according to claim 1, wherein said motor comprises a piezoelectric motor.

11. An electronic device comprising:
    a lens; and
    a focusing apparatus comprising
       a frame,
       a lens carrier carrying said lens and movable bi-directionally relative to said frame from a first position along an optical axis,
       a motor for driving said lens carrier bi-directionally along the optical axis,
       a first bending member adapted to bias said lens carrier towards the first position and further adapted to be in a pre-stressed state in the first position, and
       a second bending member adapted to bias said lens carrier away from the first position and further adapted to be in a pre-stressed state in the first position;
       said lens carrier being in an equilibrium position between the first and second bending members in the first position.

12. The electronic device according to claim 11 wherein said electronic device is a camera.

13. A method of making a focusing apparatus for a lens comprising:
    configuring a lens carrier to be movable bi-directionally relative to a frame from a first position along an optical axis;
    coupling a motor between the frame and lens carrier for driving the lens carrier bi-directionally along the optical axis;
    biasing the lens carrier towards the first position using a first bending member, the first bending member being adapted to be in a pre-stressed state in the first position; and
    biasing the lens carrier away from the first position using a second bending member, the second bending member being adapted to be in a pre-stressed state in the first position;
    the lens carrier being in an equilibrium position between the first and second bending members in the first position.

14. The method according to claim 13, wherein the first bending member defines a first aperture therein aligned with the optical axis.

15. The method according to claim 14, wherein at least a portion of the lens carrier is receivable within the first aperture.

16. The method according to claim 14, wherein the first bending member comprises at least one linking member having a first end coupled to the lens carrier.

17. The method according to claim 16, wherein the at least one linking member further comprises a second end positioned adjacent the first aperture.

18. The method according to claim 17, wherein the first bending member comprises three linking members equispaced about the first aperture.

19. The method according to claim 14, wherein the second bending member defines a second aperture therein aligned with the optical axis.

20. The method according to claim 19, wherein the second bending member comprises at least one linking member having a first end coupled to the lens carrier, and a second end positioned adjacent the second aperture.

* * * * *